United States Patent [19]
Matzke

[11] 3,869,326
[45] Mar. 4, 1975

[54] TEXTURED FILM FINISHED PANELS AND METHOD THEREFOR

[76] Inventor: William A. Matzke, 609 Somerset Dr., Green Bay, Wis. 54301

[22] Filed: Mar. 7, 1973

[21] Appl. No.: 338,968

Related U.S. Application Data

[63] Continuation-in-part of Ser. No. 172,670, Aug. 18, 1971, Pat. No. 3,738,900.

[52] U.S. Cl.............. 156/209, 156/219, 156/221, 161/119, 161/DIG. 3, 264/284, 264/293
[51] Int. Cl............................................. B31f 1/00
[58] Field of Search ............ 161/56, 116, 119, 120, 161/128, 38, DIG. 3; 156/209, 219, 221, 222, 300; 264/284, 293; 52/309, 615

[56] References Cited
UNITED STATES PATENTS

| | | | |
|---|---|---|---|
| 2,496,122 | 1/1950 | Donahue | 161/128 |
| 2,666,726 | 1/1954 | King et al. | 161/120 |
| 3,168,763 | 2/1965 | Gilbert | 161/38 |
| 3,373,068 | 3/1968 | Grosheim et al. | 156/219 |
| 3,698,978 | 10/1972 | McQuade, Jr. | 156/221 |
| 3,785,911 | 1/1974 | Ungar et al. | 161/128 |

Primary Examiner—George F. Lesmes
Assistant Examiner—Paul J. Thibodeau
Attorney, Agent, or Firm—Evelyn M. Sommer, Esq.; James M. Heilman, Esq.; Anthony J. Casella, Esq.

[57] ABSTRACT

The present invention pertains to embossed decorative patterns and decorative laminates, particularly textured film finished structural elements and the method of manufacture wherein a resilient material such as a wadding sheet or pad sheet is interposed between the surface film and the substrate. High quality uniformly embossed products of great durability are economically manufactured by this technique. The invention is particularly useful when the substrate is rigid or semi-rigid in physical characteristics or wherein the hardness varies across the surface of the substrate.

5 Claims, 1 Drawing Figure

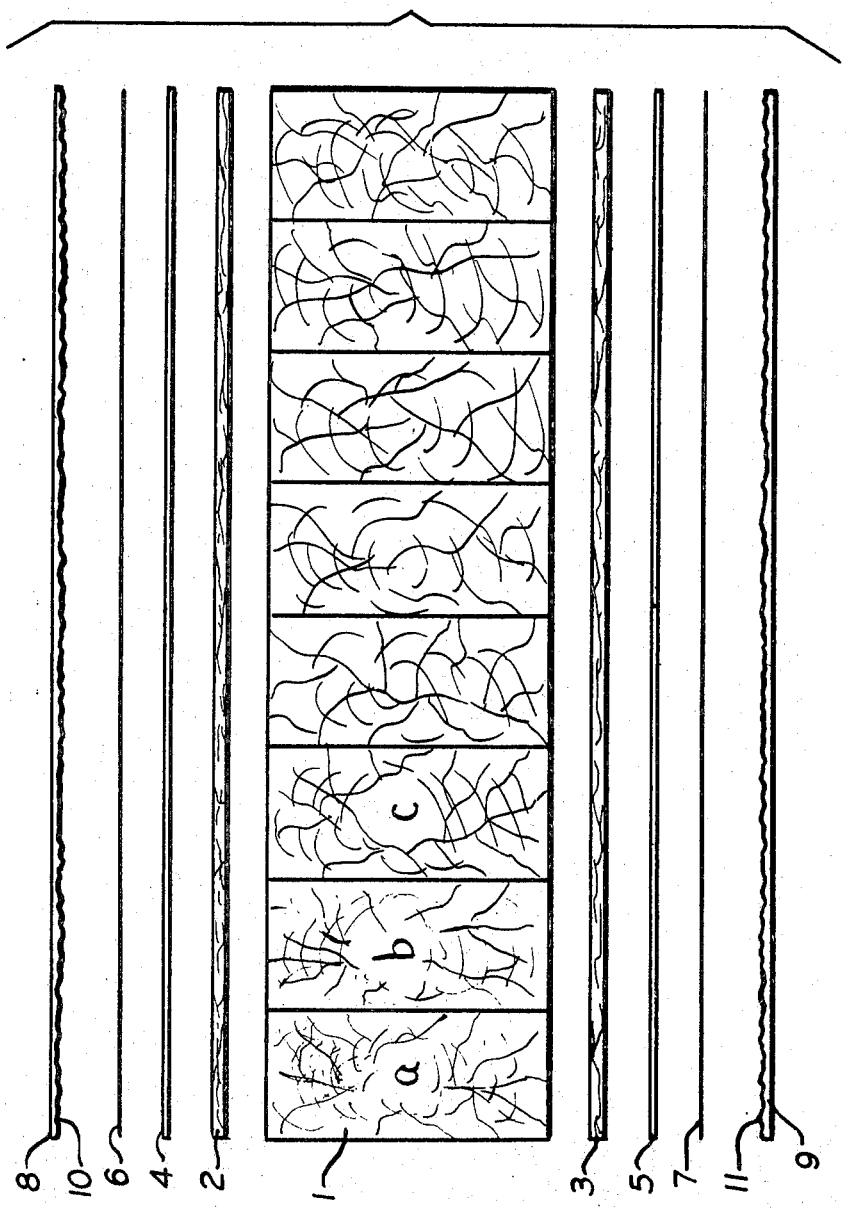

TEXTURED FILM FINISHED PANELS AND METHOD THEREFOR

The present application is a continuation-in-part application of Ser. No. 172,670, filed Aug. 18, 1971, U.S. Pat. No. 3,738,900 granted June 12, 1973.

This invention pertains to embossed decorative patterns and decorative laminates, particularly textured film finished structural elements such as panels and doors and the method of manufacture wherein a resilient material such as a wadding sheet or pad sheet is interposed between the surface film and the substrate. High quality uniformly embossed products of great durability are economically manufactured by this technique.

The present invention is broadly concerned with high quality embossed decorative patterns and with decorative laminates on structural elements, and with the method of manufacture. The invention is more particularly concerned with textured film finished structural products such as panels, partitions, doors and furniture, i.e., tables, desks, radio and television cabinets, buffets, plaques, etc. of high quality wherein a sheet of resilient material such as a wadding or pad is utilized to secure uniform and smooth even embossing of the surface film.

It is well known in the art to apply a surface film to a substrate and then to emboss or texture the surface film by various techniques. Generally it is necessary to abrade the substrate to secure a very smooth surface, remove the abrading particles, laminate the film to the smooth surface, and then emboss the applied film. Usually the embossing is accomplished by the use of very expensive engraved or etched metal caul plates or rollers.

The prior technique is expensive, and it has many disadvantages; one of which is that due to the varying densities throughout the substrate, the embossing in many instances is non-uniform and thus is less attractive. This is particularly the situation in the manufacture of textured doors and partitions wherein the densities between the edge pieces, i.e., stiles, rails and the core vary greatly.

It is also well known that preembossed films can be laminated to produce a decorative textured product. This technique also has several disadvantages which add significantly to the cost of the final product, one of which is the loss of a great deal of texture during the laminating process. Consequently, heavy gauge films are required for this type operation. Another problem with this method is unless large quantities are involved, pattern changes are very costly.

The present invention overcomes these difficulties and secures very high quality products using a one step economical process. The present technique secures a film finish of a textured appearance preferably in a one step hot press operation. The invention may be readily understood by reference to the drawing illustrating one adaptation of the same, particularly for the manufacture of a high quality textured door; a wall panel or other structural element being generally similar.

The drawing is an exploded end view of the door showing application of the various laminates. The figure illustrates a core substrate 1 which may be of any suitable rigid material. Generally the core comprises a plurality of uniform wood sections a, b, c, etc. which are rigidly adhered one to another by means of a suitable adhesive. The core may also comprise other material such as the various particleboard, Novoply (Trademark Champion International Corporation), hardboard panels, Masonite (Trademark Masonite Corp.), rigid fibrous mats, mineral cores, Weldrok (Trademark Champion International Corporation), and the like. With respect to doors, partitions, table tops, etc., it is preferred that the thickness of the core be in the range from about ¾ to 2¼ inches such as about 1⅝. The other dimensions of the core, such as length and width, are adjusted with respect to its ultimate end use.

It is also preferred that cross band veneer sheets (or skins as they are known) 2 and 3 be adhered to both faces of the core 1, wherein the grains of the sheets 2 and 3 are at right angles to the grain of the core. These cross band sheets or skins may be of any suitable material, such as thin phenolic backing sheets, but are preferably thin plywood veneers having a thickness in the range from about 1/32 to ¼ inch such as about 1/16 inch.

In accordance with the present invention, pad sheets or wadding sheets 4 and 5 are then affixed by means of a suitable adhesive, preferably a self-contained adhesive to the cross band veneers 2 and 3. These wadding sheets, i.e., resilient pads, are of uniform flexibility throughout their entire surface area so that when an impressing element is applied to the face of the film sheets, which are adhered to the pad sheets, a uniform and regular esthetic decorative pattern will be secured. It is preferred that the thickness of these resilient pads be in the range from about 0.035 to 0.008 inch such as about 0.012 inch. The basic weights preferred are in the range from about 30–120 lbs. per 24 × 36/500 sheet reams.

These resilient wadding sheets may be of any type of material that will not deteriorate under hot press conditions. It is preferred that the pads be resin saturated pads which function in the dual capacity of serving as a conforming component to receive the texture and also as the bonding sheet for the face films finish. These pads may be comprised of synthetic or natural fibrous sheets, also including fiber glass reinforced plastic (FRP). The resin system incorporated in the pad may be a urea formaldehyde system, a melamine formaldehyde or a phenol formaldehyde system or a polyester system.

Thus the fibrous sheets, or pads are for example cellulose, such as alpha cellulose, fiberglass, jute, crepe paper, or a polyester resin saturated paper. A very desirable crepe paper is of the type saturated with a phenol formaldehyde resin manufactured by Kimberly-Clark Corporation. If the pad is a pigmented pad, then the resin should be a clear polyester system such as the type manufactured by Riverside Laboratories, Inc.

Film face sheets 6 and 7 are rigidly affixed to wadding sheets 4 and 5. As pointed out heretofore this is secured preferably by the use of resin impregnated resilient pad sheets. These film sheets may comprise any suitable surface film such as Tedlar (Trademark-Dupont) film, i.e., polyvinyl fluoride, an acrylic film such as Korad (Trademark Rohm & Haas), or a polyester film such as Mylar (Trademark Dupont). The thickness of the film is in the range from about ½ mil (.0005 inch) to 3 mils (.003 inch) such as about 1½ mils (.0015 inch).

These films are flexible thermoplastic sheets which may be either clear, pigmented, metalized or printed.

Since the films are 100 percent solids, they produce a uniform uninterrupted dry finish on the final product.

A very desirable panel element is secured when the face film is clear and the wadding or pad is pigmented with the desirable color. This combination of the pigmented pad showing through the clear film produces a very pleasing and desirable aesthetic appearance.

One important aspect of the invention is to apply a film finish, develop a texture and manufacture a complete door assembly or other laminated product in a one step hot press operation. Thus a prefinished textured door or other decorative laminated product is obtained directly from the press operation. This is secured by positioning all elements or veneers 1, 2, 3, 4, 5, 6 and 7 in the press (not shown) between the press plates or press rollers and then adhering all elements one to the other using suitable adhesives or glues. As pointed out heretofore it is preferred that the resilient wads be impregnated with an adhesive resin system.

The press temperatures are preferably in the range from about 200°F. to 400°F. such as about 300°F. The pressures are preferably in the range from about 130 psi to 200 psi such as about 170 psi. The length of press operation is preferably in the range from about 5 minutes to 10 minutes such as about 7 minutes.

The etching or patterning elements may be the rolls or plates of the press itself, but are preferably impression sheets 8 and 9 which are positioned in the press with the entire assembly. These impression sheets 8 and 9 have embossing patterns 10 and 11 on their surfaces for imparting the desired pattern on face films 6 and 7. Due to the resilient wadding sheets the patterns imparted to the face sheets are uniform and regular.

Thus the present technique produces a textured face film finished panel or other laminated product in a one step process. This eliminates, as stated above, other expensive processing steps such as sanding, laminating and embossing. By the use of resilient elements adjacent the face films uniformity and regularity of the embossed designs are assured on the face films. Also the present technique permits the use of lower grade materials since the pad or wadding masks substrate defects.

Furthermore by the present technique the face film can be embossed on a pad sheet which pad sheet is adhered to a phenolic backing sheet or equivalent. Thus a thin textured laminate is produced which thin laminate can be applied to particular areas such as door edges. Thus a very desirable monolithic appearance is produced with texture on both the faces and edges of the door. A very desirable result which is secured is that the index of refraction of light of the final product is reduced, and produces a more aesthetically acceptable appearance. Also the present process secures a product which minimizes the problems of burnishing and marring. Other advantages can also be easily obtained.

The embodiments of the invention in which an exclusive property or privilege is claimed are defined as follows:

1. A process for the manufacture of a uniformly embossed face film on a substrate which comprises: positioning between press plates of an embossing press a veneer sheet on a rigid substrate including an adhesive between their adjoining surfaces; applying a sheet of loosely bonded cellulose fibers impregnated with a thermoplastic resin to the veneer sheet; positioning a sheet of deformable thermoplastic film on the cellulose fiber sheet, said deformable film having a thickness within the range of 0.0005 to 0.003 inches; and compressing the sheets and substrate in the embossing press under a die while heating the sheets to a temperature within the range of 200°F to 400°F to simultaneously effect lamination of the composite and embossment of the face film.

2. A process according to claim 1 wherein said sheet of cellulose fibers is crepe paper having a thickness within the range of 0.008 to 0.035 inches.

3. A process according to claim 1 wherein said face film is transparent and wherein the press pressure is within the range of 130 to 200 pounds per square inch.

4. A process according to claim 1 wherein said thermoplastic resin is a material taken from the group which consists of a polyester resin, urea formaldehyde, melamine formaldehyde, and phenol formaldehyde.

5. A process according to claim 1 wherein said veneer sheet is a material taken from the group which consists of alpha cellulose, fiberglass, jute, crepe paper, and polyester saturated paper.

* * * * *